United States Patent [19]

Gertler

[11] 4,285,151
[45] Aug. 25, 1981

[54] PERSONAL HYGIENE APPARATUS

[76] Inventor: Robert Gertler, 23-10A CPL Kennedy St., Bayside, N.Y. 11360

[21] Appl. No.: 21,468

[22] Filed: Mar. 19, 1979

[51] Int. Cl.³ ............................................. G09F 27/00
[52] U.S. Cl. ....................................... 40/455; 434/238
[58] Field of Search ......................... 40/455; 35/23 R; 248/111; 274/1 A; 434/263, 247, 238, 236

[56] References Cited

U.S. PATENT DOCUMENTS

| | | | |
|---|---|---|---|
| 2,118,900 | 5/1938 | Schade | 40/324 |
| 2,501,822 | 3/1950 | Kuyler | 84/95 C |
| 2,579,024 | 12/1951 | Trevor et al. | 84/95 C |
| 2,615,993 | 10/1952 | Carter | 40/455 X |
| 3,021,666 | 2/1962 | Stone | 35/23 R X |
| 3,170,265 | 2/1965 | Goldfarb | 248/111 |
| 3,467,393 | 9/1969 | Kuwayama | 274/9 |
| 3,525,862 | 8/1970 | Carter et al. | 84/95 C |
| 3,589,735 | 6/1971 | Watanabe | 274/1 A |
| 3,655,325 | 4/1972 | Toppei | 40/455 |

OTHER PUBLICATIONS

Brochure of Ozen Sound Devices, New York, N.Y. 10007, entitled "Battery Operated Miniature Phonograph Devices."

Primary Examiner—Gene Mancene
Assistant Examiner—Wenceslao J. Contreras
Attorney, Agent, or Firm—Jay L. Chaskin

[57] ABSTRACT

An apparatus for encouraging or instructing personal hygiene having a non-animated character figure of a substantially three-dimensional configuration and an audio producing means in combination with an electrically operated toothbrush. A toothbrush is supported by the character figure. Removal for use of the toothbrush activates the audio producing means for a defined period. The audio producing means recites a melody or message or combination thereof. The audio producing means will continue to operate when deactivated when the toothbrush is returned to the character figure or when the audio producing means is manually deactivated, however, when deactivated the audio producing means continue to the end of the message or melody then in progress.

2 Claims, 4 Drawing Figures

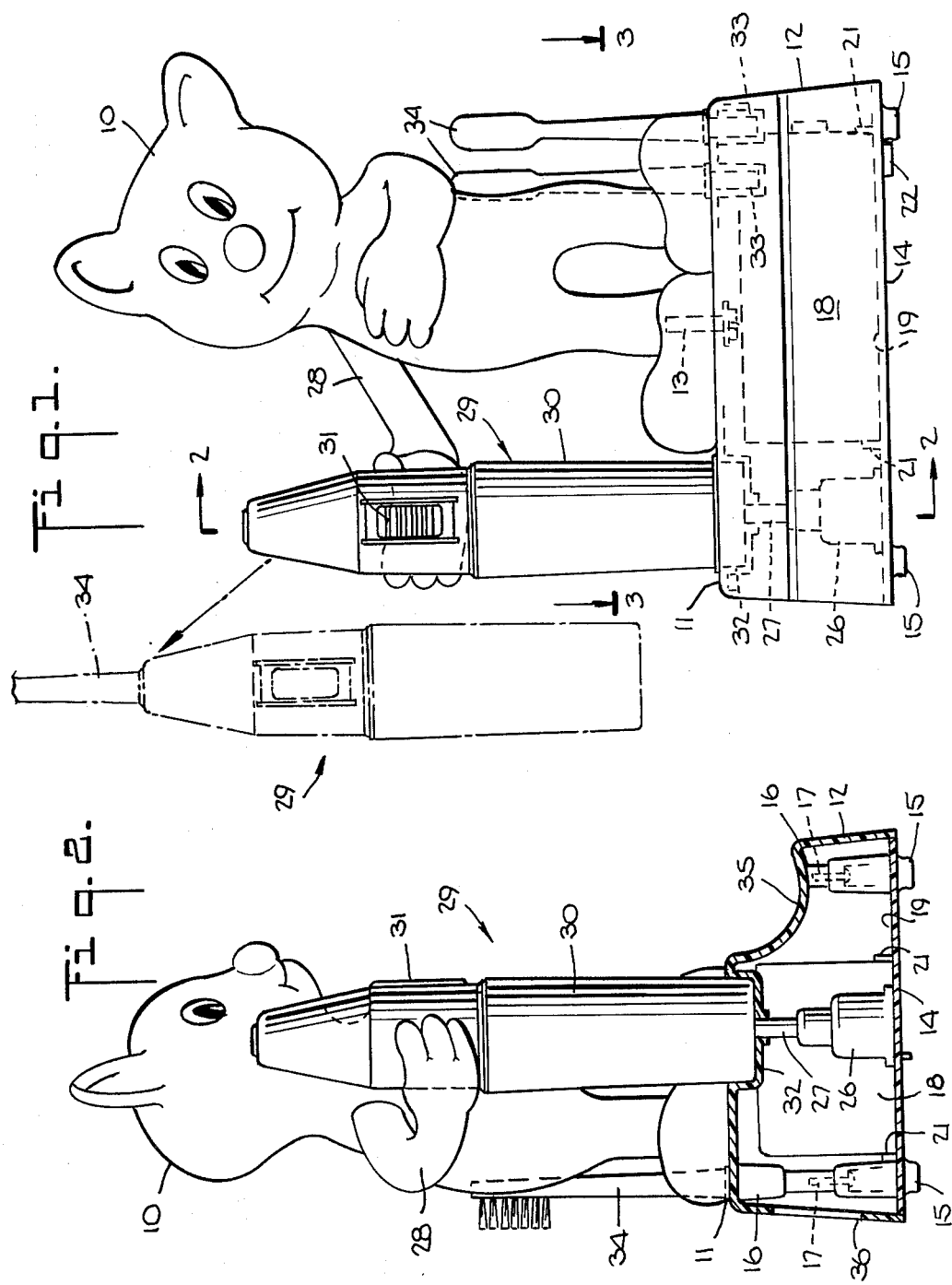

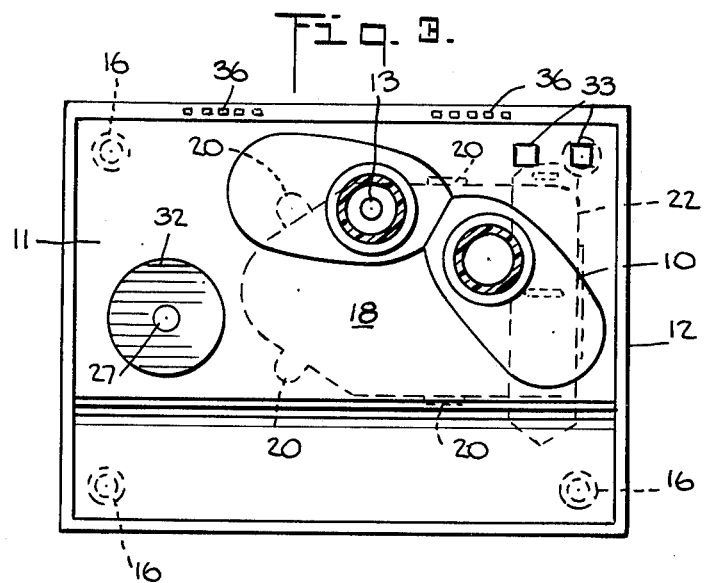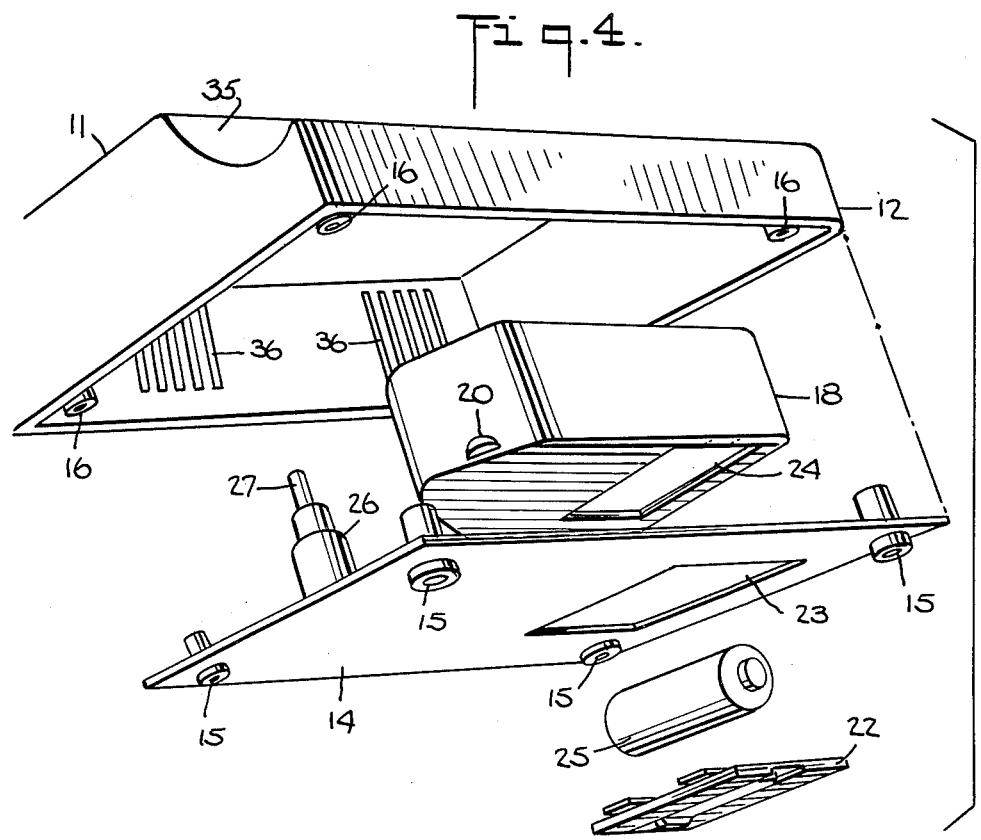

PERSONAL HYGIENE APPARATUS

BACKGROUND OF THE INVENTION

This invention is directed to a personal hygiene means and more particularly to an apparatus which encourages or instructs the use of the personal hygiene means.

U.S. Pat. Nos. 2,926,489 and 3,021,666, Stone, each disclose activating an animated character in association with a manual toothbrush. Upon removal of the toothbrush a mechanism is activated to cause the character to become animated. Upon return of the toothbrush the animation mechanism is deactivated. The mechanism may have a timer to control the period of animation or the mechanism may be cycled to a starting point upon the return of the toothbrush. The animation is not accompanied by an audio production. The character is a display or animation showing only the facial features and a portion of an appendage, the hand or paw. U.S. Pat. No. 3,998,234, Stubbman, discloses an animated display in a manner similar to the Stone patents. The toothbrush position or its removal is independent of the operation of the animated display. A control means extending from the device is operated by the user to activate the display and a sound producing device.

Each of the above patents are directed to an apparatus for encouraging or instructing the use of a personal hygiene means, a manual toothbrush. The known apparatus, however, are of a complex construction and therefore costly to manufacture and susceptible to mechanical failure.

SUMMARY OF THE INVENTION

It is an object of this invention to provide a simple and inexpensive apparatus for encouraging or instructing the use of a personal hygiene means.

It is a further object of this invention to provide, in combination with an electrically operated toothbrush, an apparatus for encouraging or instructing personal hygiene.

It is still further an object of this invention to provide a non-animated character figure having a substantially three dimensional configuration and an audio producing means in combination with an electrically operated toothbrush for encouraging or instructing personal hygiene.

The invention is an apparatus comprising a non-animated character figure having a substantially three dimensional configuration affixed to a base means. Located within the interior of the base means is an audio producing means which is activated by a switch on the base means. The character figure supports a personal hygiene means in a position which maintains the switch in the deactivated condition. Removal for use of the personal hygiene means causes the activation of the switch and thereby the audio producing means.

BRIEF DESCRIPTION OF THE DRAWINGS

The invention will be better understood from the following detailed description given in conjunction with the accompanying drawings in which:

FIG. 1 is a front partially schematic cross-sectional view of the non-animated character including a removable personal hygiene device;

FIG. 2 is a side partially schematic cross-sectional view taken along the line 2—2 of FIG. 1;

FIG. 3 is a bottom partially schematic cross-sectional view taken along the line 3—3 of FIG. 1;

FIG. 4 is a schematic exploded view of the base, the audio producing means, the closure member, the cover and the electrical source.

DETAILED DESCRIPTION OF THE INVENTION

Referring to the drawing the apparatus comprises a non-animated character figure having a substantially three dimensional configuration. The character figure 10 may be a well-known fictional or non-fictional cinema, television or literary representation, as for example, from cartoons or fairy tales or the like. The character figure may be an animal or human representation or a fanciful or imaginative representation. The character figure may be constructed of one or more pieces by known means, such as, molding, casting, carving, etc., from available or convenient materials, e.g., wood, plastic, metal, plaster, ceramics and the like. The character figure may be substantially solid throughout or hollow in parts. The character figure may include suitable colored exterior parts or may be separately provided with appropriately sized clothing or costume items. The character figure is substantially of a three dimensional configuration of the entire character figure to be represented although this is not necessary as only a selected portion of the character may be used. The character figure is securely but removably attached to an upper surface 11 of a base means 12 by suitable fasteners 13, such as, screws or adhesives. The character figure is generally intended to remain securely fixed to the upper surface 11 of the base means although it may be made removable so as to change the figure.

The base means 12 comprises a box-like structure which can be a one piece molded plastic material. A removable closure member 14 of a material similar to the base means provides access to the interior of the base means. The closure member 14 includes upstanding hollow feet 15 cooperating with a like number of hollow posts 16 extending within the interior of the base means. Fasteners 17 join the closure member 14 and the base means 12. The interior of the base means has disposed therein an audio producing means 18 such as disclosed in U.S. Pat. Nos. 3,467,393 and 3,589,735. The audio producing means 18 is removably positioned to the inner surface 19 of the closure member 14 by tabs 20 extending from the audio producing means which cooperates with locaters 21 on the inner surface 19. The closure member 14 has a removable cover 22 for an opening 23 in the closure member and an opening 24 in the base of the audio producing means to provide access to an electrical source 25, e.g., a battery, which may be the power supply for the audio producing means. Alternatively the power supply can be mechanically provided, as for example, a spring-wound motor. The electrical power supply need not be a battery as the audio producing means can be provided with a conventional connecting cord to a standard wall outlet. An electrical connection is made from the audio producing means to a switch 26 comprising a depressable button 27 which is upstanding from the inner surface 19 of the closure member. The switch 26 and buttons 27 is known per se and is of the retracting type and operates in a manner similar to the mechanism found on retracting ball point pens. The electrical connection between the button and the audio producing means is such that the audio producing means is operated by the release of the button from the depressed position. The audio producing means may include a tape recording or record disc which has an educational or encouraging or instructional message or melody or combination thereof, to the user. The tape recording or record disc may be removable so that the message can be changed.

The character figure 10 has an extended appendage 28, typically a limb or the like which is commonly associated with the representation. The extended appendage 28 in cooperation with the upper surface 11 of the base means 12 supports a personal hygiene means 29. The personal hygiene means 29 may be a comb, hair or clothes brush or toothbrush or the like or a combination of such means in quantities of one or more. In the preferred embodiment the personal hygiene means 29 is a toothbrush of the electrically operated type having a motor housing 30 and switch 31. The extended appendage 28 supports the personal hygiene means in a cavity 32 on the upper surface 11 and locates the personal hygiene means so as to maintain the button 27 in a depressed condition thereby deactivating the audio producing means 18. If the personal hygiene means is an electrically operated toothbrush the base means may include one or more openings 33 for the removal storage of the toothbrush 34 attachments. The base means 12 includes slots 36 which allows the sound from the audio producing means 18 to be easily heard.

In operation the user removes the personal hygiene means 29 from the appendage 28 of the character figure 10 and thereby releases the depressed button 27. Releasing of the depressed button 27 operates the audio producing means 18 thereby providing to the user a message or melody or combination thereof. The message or melody can be directed to encouraging or instructing the use of the personal hygiene means. The audio producing means operates for a defined period irrespective of the return of the personal hygiene means to the cavity 32 so as to depress the button. In addition even if the personal hygiene means is not returned to the cavity 32 and the button is depressed by other means, e.g., manually, the audio producing means will operate for the defined period. Further if the personal hygiene means is not returned to the cavity 32 so as to depress the button or the button is not depressed manually the audio producing means will continue to operate. During the operation of the audio producing means, if the button is depressed by either the return of the personal hygiene means or manually, the audio producing means will then operate only until the end of the message or melody then in progress and then become deactivated. If the button was depressed and released manually the return of the personal hygiene means will depress the button again. Thereafter removal of the personal hygiene means will operate the audio producing means. As used herein the phrase "defined period" means the audio period from start to the end of the message or melody then in progress.

The upper surface 20 may include a curved portion 35 for supporting a toothpaste supply or other personal hygiene accessory.

Various modification in structure and/or function may be made by one skilled in the art to the disclosed embodiment without departing from the scope of the invention as defined by the claims.

What is claimed is:

1. A personal hygiene apparatus comprising, in combination, a non-animated character figure having a substantially three dimensional configuration with non-movable character features, the character figure having an extend-appendage;

an electrically operated toothbrush having a housing removably supported at substantially one end thereof by the appendage;

a base means for vertically supporting the character figure and the toothbrush housing;

cavity means in the base means for receiving the housing and removably supporting the housing at another end thereof;

an exposed depressable upstanding button within the cavity means for engagement with the another end of the housing;

an audio producing means disposed within the base means for producing an audio production of a melody or message, the depressable button completing a circuit for operating the audio producing means;

whereby upon removal of the toothbrush housing from the cavity means the depressable button is released initiating the operation of the audio producing means and when the button is depressed the audio producing means will continue to operate only to the end of the melody or message then in progress.

2. An apparatus according to claim 1 wherein the base means has at least one opening for the removable storage of a toothbrush for the electrically operated toothbrush.

* * * * *